(12) United States Patent
Limaye et al.

(10) Patent No.: US 12,712,831 B2
(45) Date of Patent: Aug. 18, 2026

(54) SYSTEM AND METHOD FOR IMPLEMENTING CLIENT SERVICE ASPECT OF ENTERPRISE

(71) Applicant: STATE FARM MUTUAL AUTOMOBILE INSURANCE COMPANY, Bloomington, IL (US)

(72) Inventors: Manish Limaye, Bloomington, IL (US); Aaron Kammeyer, Clinton, IL (US); Daniel Dee Becicka, Bloomington, IL (US); Benjamin Schappaugh, Bloomington, IL (US); Chad Skinner, Normal, IL (US); Balamurugan Veluchamy Subramanian, Frisco, TX (US); Darin A. Smith, Le Roy, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 20 days.

(21) Appl. No.: 18/211,949

(22) Filed: Jun. 20, 2023

(65) Prior Publication Data

US 2023/0336507 A1 Oct. 19, 2023

Related U.S. Application Data

(63) Continuation of application No. 15/447,277, filed on Mar. 2, 2017, now abandoned.

(Continued)

(51) Int. Cl.

*H04L 51/04* (2022.01)
*H04L 67/10* (2022.01)
*H04L 67/306* (2022.01)

(52) U.S. Cl.

CPC .............. *H04L 51/04* (2013.01); *H04L 67/10* (2013.01); *H04L 67/306* (2013.01)

(58) Field of Classification Search

CPC ....... H04L 51/04; H04L 67/10; H04L 67/306; H04L 51/046

See application file for complete search history.

(56) References Cited

U.S. PATENT DOCUMENTS 9,307,085 B1 * 4/2016 Hanson ............... H04M 3/5235
9,652,797 B2 * 5/2017 Vijayaraghavan .... G06F 16/951

(Continued)

*Primary Examiner* — Jason D Recek
(74) *Attorney, Agent, or Firm* — Lee & Hayes, P.C.

(57) ABSTRACT

A system and method for implementing a client service aspect of an enterprise, in which clients interact with representatives via a variety of different communication channels (e.g., phone, chat, text, email). A client contacting the enterprise may be identified. After which, an internal client identification and all available client information may be retrieved from a centralized data store. A representative may quickly and easily search this information to facilitate the interaction. After a purpose of the interaction is given or determined (e.g., request a quote, or account status), the client may be prioritized based upon that purpose and/or transferred to a less busy or otherwise more appropriate communication channel. Any new client information generated during the interaction is indexed and added to the data store. A work schedule for the client service aspect may be adjusted based upon client prioritizations, channel usages, and/or projected future workloads.

20 Claims, 3 Drawing Sheets

Related U.S. Application Data

(60) Provisional application No. 62/303,525, filed on Mar. 4, 2016.

(56) References Cited

U.S. PATENT DOCUMENTS

| | | | | |
|---|---|---|---|---|
| 11,144,929 | B1 * | 10/2021 | Glenn | G06Q 30/016 |
| 2009/0150507 | A1 * | 6/2009 | Davis | H04L 51/214<br>709/207 |
| 2011/0051918 | A1 | 3/2011 | Fan | |
| 2014/0164257 | A1 | 6/2014 | Brown | |
| 2014/0257868 | A1 | 9/2014 | Hayward | |
| 2014/0278977 | A1 * | 9/2014 | Newton | G06Q 30/0255<br>705/14.53 |
| 2015/0154709 | A1 * | 6/2015 | Cook | G06F 16/24568<br>705/4 |
| 2015/0201078 | A1 * | 7/2015 | Khouri | H04M 3/5232<br>379/265.12 |
| 2016/0261594 | A1 * | 9/2016 | Vishwanath | H04L 67/55 |
| 2016/0371703 | A1 * | 12/2016 | Monegan | H04L 67/148 |
| 2017/0111507 | A1 * | 4/2017 | McGann | H04M 3/5233 |

* cited by examiner

SYSTEM AND METHOD FOR IMPLEMENTING CLIENT SERVICE ASPECT OF ENTERPRISE

RELATED APPLICATION

The present application is a continuation of U.S. patent application Ser. No. 15/447,277. filed Mar. 2, 2017 and entitled "System and Method for Implementing Client Service Aspect of Enterprise, which claims priority benefit of an earlier-filed U.S. provisional patent application entitled "System and Method for Implementing Client Service Aspect of Enterprise", Serial No. 62/3030,525, filed Mar. 4, 2016. The entire content of the identified earlier-filed applications are hereby incorporated by reference into the present application as if fully set forth herein.

FIELD OF THE DISCLOSURE

The present disclosure generally relates to systems and methods for implementing a client service aspect of an enterprise, in which clients interact with representatives via a variety of different communication channels, including making all client data available to and searchable by individual representatives to facilitate interactions and predicting future needs and adjusting future work schedules based upon past interactions.

BACKGROUND

Businesses, organizations, and other enterprises typically create and maintain client service aspects to communicate with and satisfy clients' needs. The client service aspect of an enterprise may include a variety of different components, such as phone, text, and/or web-based communication channels, recorded information, and/or informational webpages. Service requests from clients may be routed to and through these different components, and different routing schemes may make less efficient use of client service resources. In particular, a lack of or incomplete integration of client data and a lack of or incomplete integration of communication channels, which frequently results in overuse and underuse of different channels, may undermine clients' experiences.

Large enterprises may have dozens or even hundreds of unique contact center instances, which may be geographically diverse and which support diverse business units. Contact center clients may include clients, associates, third-parties, and anonymous parties, who may engage in many tens or even hundreds of millions of interactions annually, whether by phone or other communication channels. These contact centers may often be implemented and run in isolation based upon multiple factors, such as geography, business, and business capabilities and the technologies which support those capabilities. As a result, current client service systems suffer from a number of problems and disadvantages. In particular, interactions may often be longer than clients expect them to be, first contact resolution rates may be lower than businesses expect them to be, and representatives may not be as productive as contact centers expect them to be.

Much of this may be because tools and processes are inefficient. For example, contexts may not be passed between representatives, contact centers, or communication channels; there may be very limited or no ability to get real-time insight into operations; "screen pop" information (i.e., the automatic display of client and account information on a representative's screen during an interaction) may not be sufficiently detailed to help representatives quickly understand the contexts of their interactions; there may be no ability to dynamically redistribute work to the best available responders across multiple contact centers; there may be little or no automation in place to give representatives relevant knowledge during interactions; representatives may be required to log into multiple tools to take work, and there may be no common queue management capability; and representatives may not be allowed to operate in more than one contact method at a time. Further, forecasting and scheduling capabilities may not be meeting businesses' needs for all contact centers.

BRIEF SUMMARY

Embodiments of the present technology relate to systems and methods for implementing a client service aspect of an enterprise, in which clients interact with representatives via a variety of different communication channels, including making all client data available to and searchable by individual representatives to facilitate interactions, and predicting future needs and adjusting future work schedules based upon past interactions.

In a first aspect, a system may be provided for implementing a client service aspect of an enterprise, in which the client is involved in an interaction with a representative of the enterprise via a communication channel, and there are two or more available communication channels. The system may broadly comprise the following. An electronic centralized data storage element for storing client information. A workstation including an electronic processing element configured to: (1) retrieve an internal client identification for the client who has been identified based upon discernible information; (2) retrieve all available client information from the centralized data storage element for the client based upon the retrieved internal client identification; (3) prioritize the client (and/or select one of the available communication channels) based upon a discerned purpose of the interaction; (4) add to the centralized data storage element any new client information generated during the interaction; and/or (5) adjust a work schedule for the client service aspect based at least in part on a projected future workload. The system may maximize customer channel usage by directed a client from an oversaturated communication channel (e.g., telephone channel) to a under saturated or under-utilized communication channel (e.g., web chat, video, or text channel). The system may include additional, less, or alternate functionality, including that discussed elsewhere herein.

In a second aspect, a computer-implemented method may be provided for implementing a client service aspect of an enterprise, in which the client is involved in an interaction with a representative of the enterprise via a communication channel, and there are two or more available communication channels. The computer-implemented method may broadly comprise the following. The client may be identified based upon discernible information, an internal client identification may be retrieved for the identified client, and all available client information may be retrieved from an electronic centralized data storage element for the client based upon the retrieved internal client identification. A purpose of the interaction may be discerned, and the client may be prioritized, or routed to a most appropriate person or communication channel, based upon the discerned purpose of the interaction. Any new client information generated during the interaction may be added to the centralized data storage element. A work schedule for the client service aspect may be adjusted based at least in part on a projected future workload. The method may include additional, less, or alternate actions, including those discussed elsewhere herein.

In a third aspect, a non-transitory computer-readable medium with an executable program stored thereon may be provided for implementing a client service aspect of an enterprise, in which the client is involved in an interaction with a representative of the enterprise via a communication channel, and there are two or more available communication channels. The computer program may be configured to broadly instruct a system to perform the following actions. The client may be identified based upon discernible information, an internal client identification may be retrieved for the identified client, and all available client information may be retrieved from an electronic centralized data storage element for the client based upon the retrieved internal client identification. A purpose of the interaction may be discerned, and the client may be prioritized and/or routed based upon the discerned purpose of the interaction. Any new client information generated during the interaction may be added to the centralized data storage element. A work schedule for the client service aspect may be adjusted based at least in part on a projected future workload. The instructions may direct additional, less, or alternate functionality, including that discussed elsewhere herein.

Various implementations of any or all of the foregoing aspects may including any one or more of the following additional features. The two or more communication channels may include a phone channel, a chat channel, a text channel, a live video channel, and/or an email channel. The client may be identified electronically based upon a phone number and/or on an Internet protocol address being used by the client for the interaction. The available client information may include account information, a history of any past interactions, and/or a current status of the client. The purpose of the interaction may be given by the client and/or predicted electronically based at least in part on the retrieved client information.

Prioritizing the client may involve (1) monitoring electronically usage of the two or more available communication channels and offering to transfer or transferring the client from a busier communication channel to a less busy communication channel; (2) routing the client to a most appropriate person given the purpose of the interaction; (3) matching the purpose of the interaction to a most appropriate communication channel from among the two or more available communication channels; and/or (4) routing the client to a particular communication channel from among the two or more available communication channels based upon a prior experience of the client with the particular communication channel.

Adjusting electronically the work schedule for the client service aspect may include adjusting a work schedule to meet a projected traffic volume for at least one of the two or more available communication channels. The representative may be allowed to search electronically the available client information as needed to facilitate the interaction. New client information may be generated by a plurality of sources and stored in the centralized data storage element, and the new information may be indexing electronically to facilitate searching the centralized data storage element. Existing client information may be modified and stored in the centralized data storage element.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals. The present embodiments are not limited to the precise arrangements and instrumentalities shown in the Figures.

Figure 1:
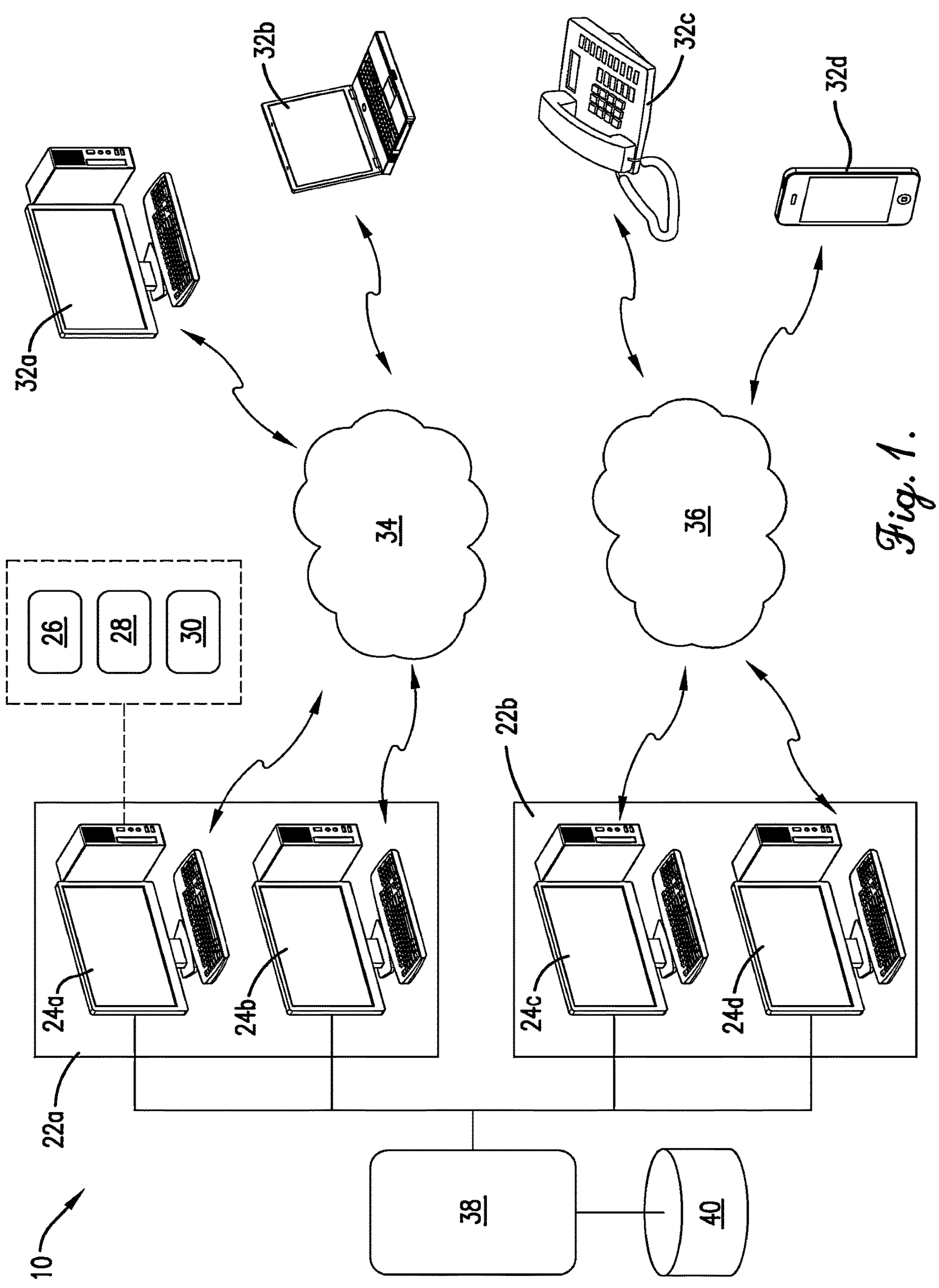
FIG. 1 is a depiction of an embodiment of an exemplary system for implementing a client service aspect of an enterprise.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

Embodiments of the present invention may relate to, inter alia, systems and methods for implementing a client service aspect of an enterprise, in which clients may interact with representatives via two or more available communication channels (e.g., phone, chat, text, video, email, Skype™). Broadly, a client contacting the enterprise may be identified, an internal client identification (e.g., client or account number) may be retrieved, and all available client information may be retrieved from a centralized data store contained on a centralized data storage element. A representative may then be able to quickly and easily search this information to facilitate the interaction. A purpose of the interaction may be given, predicted, or otherwise discerned, and the client may be prioritized based upon that purpose, which may include transferring the client to a less busy or otherwise more appropriate communication channel. Any new client information generated during the interaction may be indexed and added to the data store. A work schedule for the client service aspect may be adjusted based at least in part on client prioritizations, channel usages, and projected future workloads.

In more detail, these embodiments may enhance clients' experiences with the client service aspect of the enterprise by aggregating client information from different sources into a centralized data store, and then using that information to match the client's service request to the right communication channel in real-time based upon, for example, data about the ability of the service type to quickly and/or efficiently address the service request, whether the channel is saturated, whether the client has a history of interacting well with the channel (e.g., whether the client appears to be a visual or an audio learner/communicator), and any other information the enterprise may have or may be able to access. Foundational data may allow the enterprise to discern the context of the interaction, i.e., who is calling; what are they calling about (e.g., inquiring about an insurance quote; current home or vehicle loan insurance rates; insurance claims or how to submit an insurance claim; how to establish a new financial, checking, bank, or mutual fund account; and/or the status an existing financial account); what are their accounts (such as financial and/or insurance accounts), insurance policies, past history and current status; and other business information. This integration of available data facilitates making data-driven decisions. As a service request is routed through the different channels in real-time, any new information provided by the client may be combined with the existing client information in the centralized data store for use in future interactions or other processes.

Each client interaction may be stitched together from start to finish using different technologies, from the centralized data store to the representative's workstation. In particular, the system may associate the client's past history with the present event (i.e., the purpose of the interaction), and attempt to predict the desires and/or needs of the client in real-time. Increased or even immediate access is facilitated by real-time routing of clients from oversaturated channels (e.g., phone) to under saturated channels (e.g., web-based chat), thereby maximizing client channel usage. For example, if the average wait time for a phone interaction is significantly longer than the average wait time for another form of interaction, then the client may be offered the opportunity to transfer to, or may be transferred to, the less saturated channel.

Most or all available channels may be treated as aspects of a single system, rather than as distinct systems with no ability to complement or otherwise support each other. Further, each client may be connected to the most qualified person available based upon such factors as any previously and currently collected client information, the purpose (insurance quote versus claim handling, auto versus home or life insurance inquiries, etc.) and priority of the interaction, any given or predicted client preferences or needs, and resource availability.

As used herein, the term "interaction" may refer to a communication that a client has with an enterprise concerning a product, service, or other solution. Every interaction may involve a variety of different technologies, such as telephony infrastructure, a front-end queuing mechanism, an automated service application, and a work bench (e.g., Call Tracker). When an interaction is created it may have any of a variety of different structures, such as structured, semi-structured, and/or unstructured data. In addition, an interaction may be of other types, such as chat, email, or task, and different information technology systems may serve these different interaction types. Further, each interaction may involve multiple events, and each event may create data. For example, if each interaction creates 100 kilobytes of data, then each year of operation may result in –200 Terabytes of additional data. Accommodating such large data volumes may require a "Big Data" framework.

Thus, the present invention provides a number of advantages, such as managing pooled resources; providing historical and real-time insight into the operations of the pooled resources; identifying caller context regardless of the caller's relationship to the enterprise (e.g., client, employee, third-party); and tying an interaction together as it passes from representative to representative or from contact center to contact center. Further, the present invention may enable contact centers to match pooled resources to interaction demand by determining workforce needs (i.e., predictive forecasting) and then build schedules to staff the contact centers.

I. Exemplary System

Referring to FIG. 1, an embodiment of a system 10 for implementing a client service aspect of a business, organization, or other enterprise, wherein the client may be involved in an interaction with a representative of the enterprise via one or two or more communication channels, may broadly comprise the following. The two or more communication channels may include any suitable forms of communication, such as phone, audio chat, text, video chat, and/or email. The enterprise may include one or more contact centers 22*a*,22*b*. Each contact center 22*a*,22*b* may include one or more workstations 24*a*,24*b*,24*c*,24*d* configured to facilitate interaction between representatives of the enterprise and clients. Some or all such workstations 24*a*, 24*b*,24*c*,24*d* may include an electronic memory element 26, an electronic processing element 28, and an electronic communication element 30.

The electronic memory element 26 may be configured to at least temporarily store information, such as the some or all of the available client information relevant to a current interaction, and especially any new client information generated during the interaction. As such the memory element 26 may be in communication with an electronic centralized data storage element 40. The memory element 26 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The electronic processing element 28 may be configured to facilitate the functionality of the workstation as discussed herein, which may involve accessing the data stored in the memory element 26 and/or data storage element 40, and communicating through the communication element 30.

The electronic communication element 30 may be configured to communicate with a plurality of client devices 32*a*,32*b*,32*c*,32*d* via one or more communications network 34,36. According to some embodiments, the communication element 30 may include one or more transceivers (e.g., WWAN, WLAN, and/or WPAN transceivers) functioning in accordance with IEEE standards, 3GPP standards, or other standards, and configured to receive and transmit data via one or more external ports. The one or more communication networks 34,36 may facilitate substantially any type of data communication via any standard or technology (e.g., GSM, CDMA, TDMA, WCDMA, LTE, EDGE, OFDM, GPRS, EV-DO, UWB, WiFi, IEEE 802 including Ethernet, WiMAX, and/or others). The networks 34,36 may also support various local area networks (LANs), personal area networks (PAN), or short range communication protocols.

The client devices 32*a*,32*b*,32*c*32*d* may be configured to allow clients to facilitate interaction between the clients and the representatives of the enterprise via the one or more communications networks 34,36. The client devices 32*a*, 32*b*,32*c*32*d* may include substantially any suitable devices, such as desktop, laptop, notebook, and/or tablet computers; conventional telephones and/or smart phones; and other wired and/or wireless devices.

The enterprise or, additionally or alternatively, some or all of the contacts centers 22*a*,22*b* may further include a centralized electronic processing element 38 configured to facilitate some of the functionality of the present invention, such as facilitating communication between the workstations 24*a*,24*b*,24*c*,24*d* and the data storage element 40, and/or adjusting the work schedule as discussed below.

The enterprise further includes the data storage element 40 configured to contain all available client information for each client of the enterprise or, at least, each client of the contact center 22*a*,22*b*. In one implementation, the data storage element 40 may contain a single, centralized "Big Data" data store in which all relevant data is integrated to all contact center interactions. Operational dashboards, machine learning for real-time business decisions, and historical reporting and analytic capabilities may be implemented in real-time. Data may be streamed in real-time into the enterprise data lake to support enterprise patterns and needs for interaction data (for all parties involved in interactions).

The various contact centers may have a number of different needs. Some contact centers may need to manage large volumes of such data, to access it in real-time, and to be able to transfer it wherever it may be useful throughout the contact center. Some contact centers may need to be able to gain business-relevant insights about interaction data in real-time and historically in support of real-time operational dashboards, in support of real-time decisions about routing work within the contact center, and in support of real-time and historical analysis to enable business decisions about management of the contact center. Other contact centers may need to manage substantial variability within contact center interaction data, which may be a combination of system-generated as well as business transactional data, may span multiple contact technologies vendors, and may be variable with regard to structure and format.

Embodiments of the system 10 may function substantially as follows when a client initiates an interaction by using a client device 32*a*,32*b*,32*c*,32*d* to contact a contact center 22*a*,22*b* of the enterprise via a communication network 34,36. At the contact center 22*a*,22*b*, a representative of the enterprise may use a workstation 24*a*,24*b*,24*c*,24*d* to engage the client. The client may be identified based upon discernible information, an internal client identification may be retrieved for the identified client, and all available client information may be retrieved from an electronic centralized data store for the client based upon the retrieved internal client identification. A purpose of the interaction may be discerned, and the client may be prioritized based upon the discerned purpose of the interaction. Any new client information generated during the interaction may be added to the electronic centralized data store. A work schedule for the client service aspect may be adjusted based at least in part on a projected future workload.

The system 10 may include more, fewer, or alternative components and/or perform more, fewer, or alternative actions, including those discussed elsewhere herein, and particularly those discussed in the following section describing the computer-implemented method.

II. Exemplary Computer-Implemented Method

Figure 2:
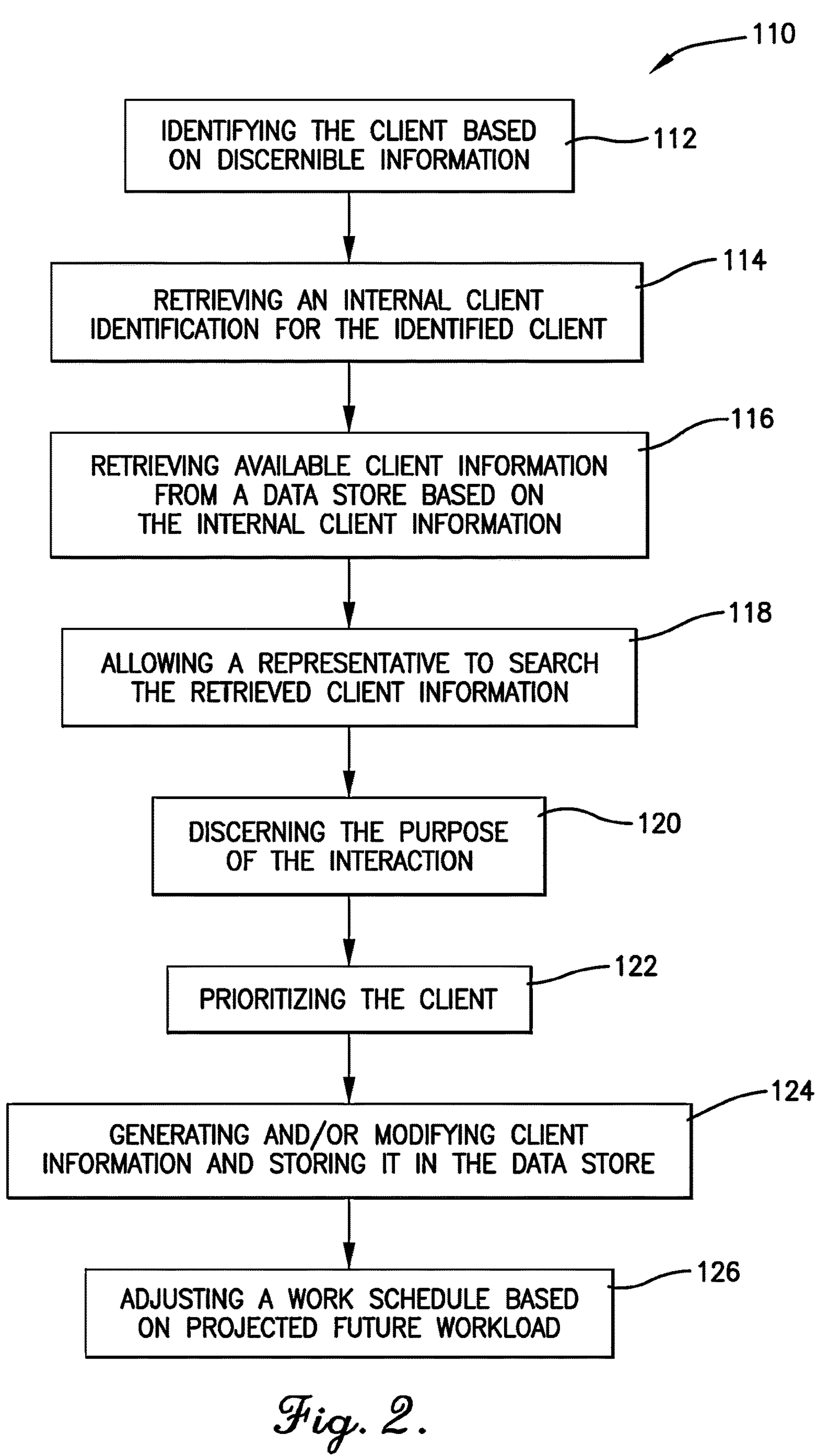
FIG. 2 is a flowchart of an embodiment of an exemplary computer-implemented method for implementing a client service aspect of an enterprise.

Referring also to FIG. 2, an exemplary embodiment of a computer-implemented method 110 is shown for implementing a client service aspect of a business, organization, or other enterprise, wherein the client may be involved in an interaction with a representative of the enterprise via one or two or more communication channels, may broadly comprise the following. The method 120 is a corollary to the functionality of the system 10 of FIG. 1, and may be similarly implemented using the system components shown in FIG. 1.

Embodiments of the method 110 may function substantially as follows when a client initiates an interaction by using a client device 32*a*,32*b*,32*c*,32*d* to contact a contact center 22*a*,22*b* of the enterprise via a communication network 34,36. At the contact center 22*a*,22*b*, a representative of the enterprise may use a workstation 24*a*,24*b*,24*c*,24*d* to engage the client. At or near the beginning of the interaction, the client may be identified based upon discernible information, as shown in 112. The client may be identified based upon, e.g., a phone number or an Internet protocol address associated with the client device 32*a*,32*b*,32*c*,32*d* being used by the client for the interaction. An internal client identification (e.g., a client or account number) may be retrieved from the data storage element 40 for the identified client, as shown in 114. All available client information may be retrieved from a centralized data store contained on the data storage element 40 based upon the retrieved internal client identification, as shown in 116. The available client information may include, e.g., account information; type of accounts (such as auto, homeowners, or life insurance accounts, vehicle or home loan accounts, mutual fund or bank accounts, and/or other insurance-related or financial accounts); a history of any past interactions; upcoming due dates (loan payment due date, or insurance policy renewal date); a current status of the client; and/or a current status of an insurance-related and/or financial account(s). The representative may be allowed to search the available client and/or account information in the centralized data store contained on the data storage element 40 and/or the workstation memory element 26 as needed to facilitate the interaction, as shown in 118.

The purpose of the interaction may be discerned, as shown in 120. The purpose of the interaction may be discerned by being given or provided by the client (e.g., submit an insurance claim; check insurance claim status; check insurance policy status; check financial account status; check current interest rates for home, auto, or personal loans; check available mutual funds, etc.) and/or predicted based at least in part on the retrieved client information. The client may be prioritized based upon the discerned purpose of the interaction, as shown in 122.

Prioritizing the client may involve (1) monitoring usage of the two or more communication channels and offering to transfer or transferring the client from an oversaturated or busier communication channel to an under saturated or less busy communication channel; (2) routing the client to a most appropriate person given the purpose of the interaction; (3) matching the purpose of the interaction to a most appropriate communication channel from among the two or more available communication channels; and/or (4) routing the client to a particular communication channel from among the two or more available communication channels based upon a prior experience of the client with the particular communication channel.

Any new client information generated or existing information modified during the interaction may be added to the centralized data store contained on the data storage element 40, as shown in 124. The new client information may be indexed to facilitate searching the centralized data store.

A work schedule for the client service aspect, including the representatives in the contact center 22*a*,22*b*, may be adjusted based at least in part on a projected future workload, as shown in 126. Adjusting the work schedule for the client service aspect may include adjusting a work schedule to meet a projected traffic volume for at least one of the two or more available communication channels.

In more detail, data movement may involve moving information from data producers into the centralized data store. A data producer may be any application or user interface involved in an interaction. Data is streamed into the centralized data store in real-time throughout the interaction, from beginning to end. Real-time streaming allows for near real-time ad hoc searching on all the interaction data elements. The data may be created and streamed by various producers to the centralized data store in a common format (e.g., JSON or XML) or compatible formats, or the data may be streamed in a variety of different formats and may then be reformatted into a common format or compatible formats.

To enable data streaming and creating a robust data movement architecture, a data pipeline (e.g., Apache Kafka) may be implemented and used as the entry portal for high speed data ingest. The pipeline may contain multiple topics, typically one for each producer in order to store the data pertinent to that producer. Producers send messages to broker topics and specify the partition to use for every message they produce. Message production may be synchronous from one producer or asynchronous from multiple producers. Consumers listen for messages on topics and process the asynchronous feed of published messages. Once the data is in ingested in the data pipeline, an ingest system (e.g., Apache Flume) may be used to process the job (the "Flume Job"). The Flume job is a constantly running process/daemon which listens to the source queue and when there is a new message in the queue, the Flume job consumes and process it. In one implementation, the interaction data in the data table is indexed by an indexer to facilitate such searching. The indexer may run continuously as a daemon and pick up any addition, change, or removal of the data in the data table.

In one implementation, the data design may be chosen to provide real-time access to contact center interaction data supporting persistence of interaction data (representative-to-representative transfer, contact center-to-contact center transfer, etc.); real-time access to operational analytics; flexibility to support a data model which facilitates adding data producers without impacting existing technical and business processes; operational mastery of contact center interaction data; accommodation of high-volume creation and low latency access to varied data types, such as structured, unstructured, and semi-structured data (phone system logs, chat transcripts, call representative disposition, etc.); and time series analysis of interaction data in real-time (i.e., as the data is created and available for use) to support multiple contact center business capabilities (e.g., routing decisions, real time dashboards, context transfer, ad hoc and real time search, etc.). Suitable data designs include columnar HBase No SQL data store.

For the interaction application, there may be multiple services to carry out business functionalities, such as an interaction write service to put interaction data to the topics; an interaction read service to get interaction data from the data table; an interaction legacy service to both write and read session data to support any legacy consumers; an agent event service to put agent event data to the topics; an interaction Flume Job, including a serializer, to read messages from topics, process the messages, and store them in a data table; and an agent event Flume Job, including a serializer, to read messages from topics, process the messages, and store them in a data table.

A Call Tracker application is an application with a user interface intended to capture interaction data supplemented with business information about the client. It pulls the interaction data that was produced by other applications, and it allows for further modification on the interaction. Once the interaction data is populated on the Call Tracker application, representatives work through the interaction and, when the interaction is complete, modified data are saved back.

A security layer may secure web services and operations from unauthorized use. In one implementation, calling applications are expected to be authenticated by the username, and producer applications use corresponding application identifications.

The present invention may also provide back up and disaster functionality. In one implementation, some or all components may be mirror copies of the primary site, which enables an active topology and allows the contact center to seamlessly activate the disaster recovery site when needed. The primary center ingests data from various data producers, and after the Flume has completed calculating any contact center metrics on the data, the record is sent to the disaster recovery site queue. The record sent to the disaster recovery queue, ingests the data into the disaster recovery data store. In the event of a disaster, a configuration change is made to the Enterprise Service Bus (ESB) to point to the new URL that matches the disaster recovery location. The disaster recovery location will need to hold on to the data until the primary location is back up. After that a catch up process will be run to bring the primary in sync with the disaster site.

With regard to workload management, job scheduling becomes increasingly important when applications are used in a production environment. Using a job scheduler helps to ensure that multiple applications, or components of the same application, do not dominate the resources of the cluster. Further, in a multi-tenant environment, disparate workloads may need to be managed. In one implementation, the goal of the job scheduler is to provide fast response times for small jobs while not starving long running jobs. This may be accomplished by grouping jobs in pools; assigning each pool a guaranteed minimum share of task slots; and splitting excess capacity between jobs. Further, weights may be assigned to pools. Pools with higher weights may get more slots. For example, a default weight of 1 means that 1 slot is allocated for each round of excess slot assignment, while a default weight of 2 means that 2 slots are allocated for each round. Every job is assigned to a pool. By default, jobs that are uncategorized go into a default pool. Pools can be groups within the organization or different groups of applications like batch or production. Pools are created dynamically when jobs are called. The job scheduler may be used in tandem with a queue-based access control system to restrict which pools each user can access.

The workload management strategy should consider the various workloads that are expected in the environment. These workloads will be defined based upon the type of work being performed, user expectations for response, and the priority of the work within the environment. This allows for balancing various types of workloads and enabling the environment to meet a majority of end-user expectations. Other considerations, such as run-time for certain workloads, should also be incorporated into the initial pool set. Additionally, a default pool will be created that will assign a low priority service class to those jobs that do not identify with an existing policy.

The computer-implemented method may include more, fewer, or alternative actions, including those discussed elsewhere herein.

III. Exemplary Computer-Readable Medium

Referring again to FIG. 2, a non-transitory computer readable storage medium (e.g., a standard random access memory (RAM), an optical disc, a universal serial bus (USB) drive, or the like) with a computer program stored thereon for implementing a client service aspect of a business, organization, or other enterprise, wherein the client may be involved in an interaction with a representative of the enterprise via one or two or more communication channels, wherein the computer program is configured to instruct a system, such as the system 10 of FIG. 1, to broadly perform the following. In particular, the computer-readable program code may be adapted to be executed by the processing element 28 and other computing resources of the contact center 22*a*,22*b* and, more generally, of the enterprise to facilitate the functionality described herein. In this regard, the program code may be implemented in any desired language, and may be implemented as machine code, assembly code, byte code, interpretable source code or the like (e.g., via C, C++, Java, Actionscript, Objective-C, Javascript, CSS, XML).

Embodiments of the computer program may function substantially as follows when a client initiates an interaction by using a client device 32*a*,32*b*,32*c*,32*d* to contact a contact center 22*a*,22*b* of the enterprise via a communication network 34,36. At the contact center 22*a*,22*b*, a representative of the enterprise may use a workstation 24*a*,24*b*,24*c*,24*d* to engage the client. At or near the beginning of the interaction, the client may be identified based upon discernible information, as shown in 112.

The client may be identified based upon, e.g., a phone number or an Internet protocol address associated with the client device 32*a*,32*b*,32*c*,32*d* being used by the client for the interaction. An internal client identification (e.g., a client or account number) may be retrieved from the data storage element 40 for the identified client, as shown in 114. All available client information may be retrieved from a centralized data store contained on the data storage element 40 based upon the retrieved internal client identification, as shown in 116. The available client information may include, e.g., account information (such as vehicle, auto, home, or personal loan account information or status; financial, bank, credit card, debit card, mutual fund, or other financial account information or status; and/or auto, homeowners, renters, life, health, pet, burial, or other insurance policy information or claim status); a history of any past interactions; and/or a current status of the client or various accounts. The representative may be allowed to search the available client information in the centralized data store contained on the data storage element 40 and/or the workstation memory element 26 as needed to facilitate the interaction, as shown in 118.

The purpose of the interaction may be discerned, as shown in 120. The purpose of the interaction may be discerned by being given by the client and/or predicted based at least in part on the retrieved client information. The client may be prioritized based upon the discerned purpose of the interaction, as shown in 122.

Prioritizing the client may involve monitoring usage of the two or more communication channels, and offering to transfer or transferring the client from an oversaturated or busier communication channel to an under saturated or less busy communication channel. Prioritizing the client may involve routing the client to a most appropriate person given the purpose of the interaction, such as following-up on an insurance or loan application, or checking the status of an insurance claim. Prioritizing the client may involve matching the purpose of the interaction to a most appropriate communication channel from among the two or more available communication channels, for instance, some channels may be more appropriate for detailed discussions with the client while other channels may be more appropriate if the client inquiry is of a limited nature. Additionally or alternatively, prioritizing the client may involve routing the client to a particular communication channel from among the two or more available communication channels based upon a prior experience of the client with the particular communication channel, such as recent client interactions regarding insurance quotes, an insurance claim, or loan interest rates.

Any new client information generated or existing information modified during the interaction may be added to the centralized data store contained on the data storage element 40, as shown in 124. The new client information may be indexed to facilitate searching the centralized data store.

A work schedule for the client service aspect, including the representatives in the contact center 22*a*,22*b*, may be adjusted based at least in part on the result of prioritizing the client, as shown in 126. Adjusting the work schedule for the client service aspect may include adjusting a work schedule to meet a projected traffic volume for at least one of the two or more available communication channels. The one or more executable programs stored on the non-transitory computer-readable medium may instruct the system to perform more, fewer, or alternative actions, including those discussed elsewhere herein, and particularly those discussed in the section describing the computer-implemented method.

IV. Exemplary Embodiments

The present embodiments may create an enterprise level solution that tracks interactions, regardless of method, channel, or organization role (e.g., customer or associated) that provides real-time access to operational data and improves the ability of the organization to achieve desired business outcomes. The contact method may be agnostic. The present embodiments may (i) provide rich contextual information about the interactions, with customer or agent permission or affirmative consent, regardless of contact method; (ii) analyze data to provide capabilities associated with real time and historical data; (iii) streamline sign-on to the contact method (phone, chat, etc.); (iv) screen pop-ups (such as pop ups displaying info to customer and/or call center representatives) regardless of contact method; (v) be real time in nature (capture of data and reporting; (vi) enable seamless integration of core capabilities across access channels, contact methods, and/or technical solutions; and/or (vii) enable new data elements for forecasting workforce needs.

Figure 3:
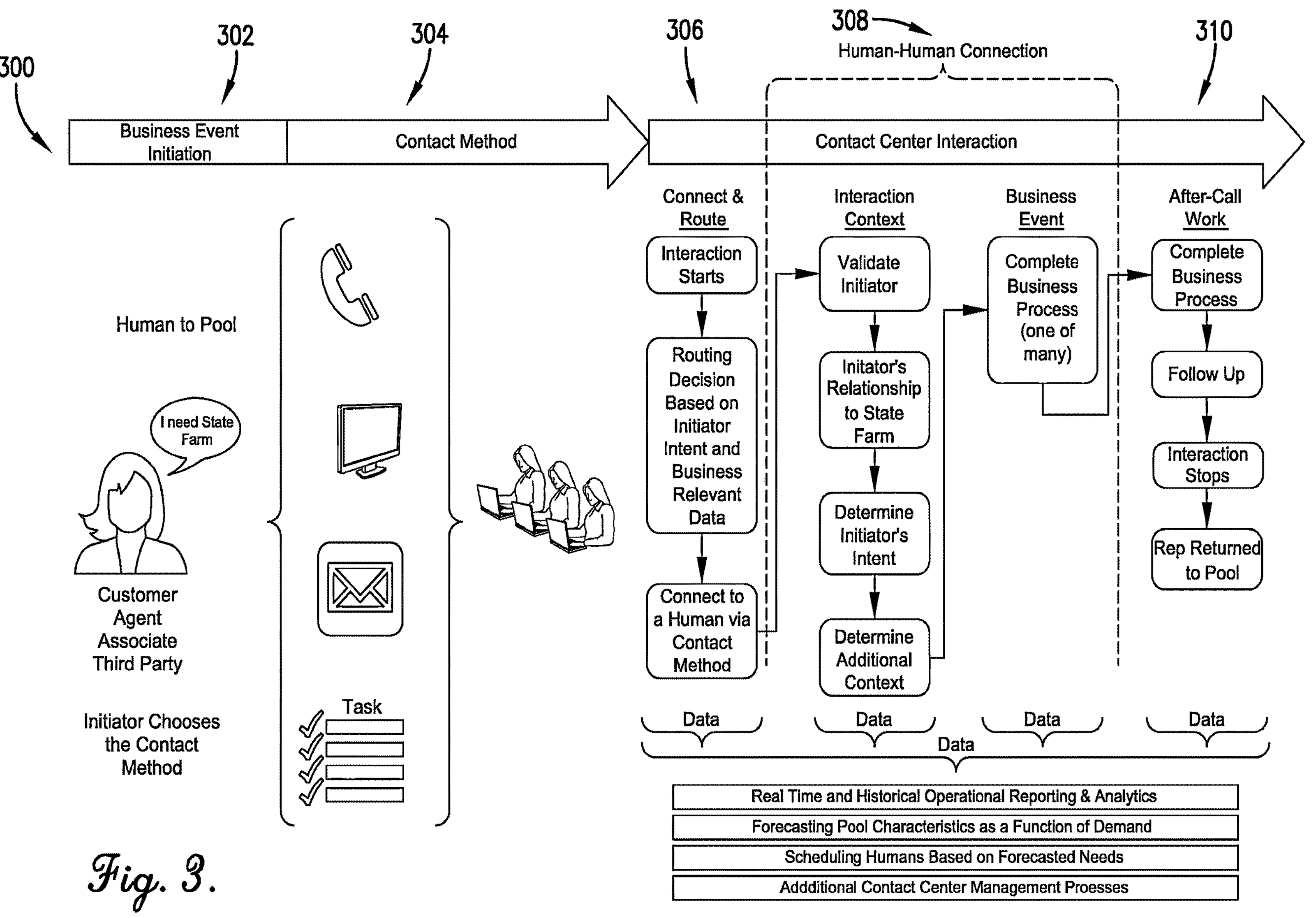
FIG. 3 depicts an exemplary computer-implemented method of directing contact center interaction.

FIG. 3 depicts an exemplary computer-implemented method of directing contact center interaction 300. The method 300 may include receiving a business event initiation 302 from a customer, agent, associate, or third party. The business event may relate to receiving an insurance quote; submitting an insurance claim; finding out the status of an insurance claim; applying for auto, home, life, health, pet, or other insurance; applying for a home, auto, or personal loan; checking the status of an application for insurance or a loan; checking the current status of an insurance policy; and/or checking the current amount of a financial account, such as a checking or savings account.

The method 300 may include the business event being initiated 302 via one or more contact methods 304, such as phone, computer or mobile device, chat, or email. The initiator may choose the contact method. The business event initiation 302 may be presented to one or more customers at a call center.

The method 300 may include connecting and routing 306 the initiator to and within a call center. After the interaction begins, a routing decision may be made based upon initiator intent (e.g., receive a quote for a home loan or auto insurance, file a claim, pay a bill, check account status, etc.). The routing decision may also be made based upon business relevant data, such as preferences for interactions based upon type of intent or request (or desired actions, e.g., receive quote or file claim, bind, stop a policy, etc.), or experience level or desired experience level of contact center representative handling the intent or request. After the routing decision, the initiator may be connected to a human or call center representative via the contact method.

After which, the method 300 may include facilitating a human-human connection 308. During an interaction context, the method 300 may include validating the initiator's identity; determining the initiator's relationship to an insurance or financial services provider (such as existing customer, new customer, etc.); determining or verifying the initiator's high level intent or determining very specific level of intent (such as what is the current status of an insurance application filed yesterday); and/or determining additional context. The method 300 may include completing one or more business processes or events (such as provide quote, or handling insurance claim).

The method 300 may include after-call work 310, such as completing the business process; following-up with the initiator; stopping the interaction; and/or returning the call center representative to a pool of available call center representatives at a call center. The method 300 may include additional, less, or alternate actions, including those discussed elsewhere herein.

In one aspect, a computer-implemented method for implementing a client service aspect of an enterprise may be provided. The client may be involved in an interaction with a representative of the enterprise via a communication channel, and there may be two or more available communication channels. The computer-implemented method may include (1) monitoring two communication channels to determine a wait time for each communication channel (such as using known techniques); (2) identifying the client based upon discernible information (such as telephone number, mobile device ID, or website ID); (3) retrieving an internal client identification for the identified client; (4) retrieving all available client information from an electronic centralized data storage element for the client based upon the retrieved internal client identification; (5) discerning a purpose of the interaction; and/or (6) routing the client to a best communication channel based upon (i) the purpose of the interaction, and/or (ii) which of the two communication channels has a lowest wait time to facilitate routing customers to a free channel at a call center that is qualified to handle customer interactions associated with the purpose of the interaction to enhance the customer experience. The method may include additional, less, or alternate actions, including those discussed elsewhere herein, and may be implemented via one or more local or remote processors and/or transceivers, and via computer-executable instructions stored on non-transitory computer-readable medium or media.

The enterprise may be an insurance provider; the two communication channels may relate to telephone and online chat (or email), respectively; and/or the purpose of the interaction may be one of: receive an auto, vehicle, life, or health insurance quote, or file an insurance claim. Additionally or alternatively, the enterprise may be a financial services provider; the two communication channels may relate to telephone and online chat (or email), respectively; and/or the purpose of the interaction may be one of: receive an interest rate quote for a home, vehicle, or personal loan, or receive a current amount or status of a financial account.

The method may include adding to the electronic centralized data storage element any new client information generated during the interaction; and/or adjusting electronically a work schedule for the client service aspect based at least in part on a projected future workload. The purpose of the interaction may be determined from (i) manually entered text that is entered from a customer; (ii) machine-generated data (such as determining that a bill is due from customer data); (iii) a predicted life event (such as marriage, home move, home or auto purchase, or birth); and/or (iv) computer analysis of user voice or audio response to one or more questions (such as "quote," "claim," "loan," or "pay bills").

The method may further include routing the client to a best (or most qualified) call center representative via the best communication channel based upon (i) the purpose of the interaction, (ii) which of the two communication channels has a lowest wait time, and/or (iii) which call center representative is best qualified to handle the customer interaction based upon (a) call center representative experience, (b) the purpose of the interaction, and (c) a type of the communication channel with the lowest wait time.

In another aspect, a computer system for implementing a client service aspect of an enterprise may be provided. The client may be involved in an interaction with a representative of the enterprise via a communication channel, and there may be two or more available communication channels. The computer system may include one or more processors and/or transceivers configured to: (1) monitor two communication channels to determine a wait time for each communication channel; (2) identify the client based upon discernible information (such as telephone number, mobile device ID, or website ID); (3) retrieve an internal client identification for the identified client; (4) retrieve all available client information from an electronic centralized data storage element for the client based upon the retrieved internal client identification; (5) discern a purpose of the interaction; and/or (6) route the client to a best communication channel based upon (i) the purpose of the interaction, and/or (ii) which of the two communication channels has a lowest wait time to facilitate routing customers to a free channel at a call center that is qualified to handle customer interactions associated with the purpose of the interaction to enhance the customer experience. The computer system and/or associated processors may be configured to have additional, less, or alternate functionality, including that discussed elsewhere herein.

For instance, the enterprise may be an insurance provider; the two communication channels may relate to telephone and online chat (or email), respectively; and/or the purpose of the interaction may be one of: receive an auto, vehicle, life, or health insurance quote, or file an insurance claim. Additionally or alternative, the enterprise may be a financial services provider; the two communication channels may relate to telephone and online chat (or email), respectively; and/or the purpose of the interaction may be one of: receive an interest rate quote for a home, vehicle, or personal loan, or receive a current amount or status of a financial account.

The computer system may be further configured to: add to the electronic centralized data storage element any new client information generated during the interaction; and/or adjust electronically a work schedule for the client service aspect based at least in part on a projected future workload. The purpose of the interaction may be determined from (i) manually entered text that is entered from a customer; (ii) machine-generated data (such as determining that a bill is due from customer data); (iii) a predicted life event (such as marriage, home move, home or auto purchase, or birth); and/or (iv) computer analysis of user voice or audio response to one or more questions (such as "quote," "claim," "loan," or "pay bills").

The system may be further configured to route the client to a best (or most qualified) call center representative via the best communication channel based upon (i) the purpose of the interaction, (ii) which of the two communication channels has a lowest wait time, and/or (iii) which call center representative is best qualified to handle the customer interaction based upon (a) call center representative experience, (b) the purpose of the interaction, and (c) a type of the communication channel with the lowest wait time.

V. Additional Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor implemented. For example, at least some of the operations of a method may be performed by one or more processors or processor-implemented hardware modules. The performance of certain of the operations may be distributed among the one or more processors, not only residing within a single machine, but deployed across a number of machines. In some exemplary embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor implemented modules may be located in a single geographic location (e.g., within a home environment, an office environment, or a server farm). In other exemplary embodiments, the one or more processors or processor-implemented modules may be distributed across a number of geographic locations.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim tem be limited, by implication or otherwise, to that single meaning. Finally, unless a claim element is defined by reciting the word "means" and a function without the recital of any structure, it is not intended that the scope of any claim element be interpreted based upon the application of 35 U.S.C. § 112, sixth paragraph.

The term "insurance policy," as used herein, generally refers to a contract between an insurer and an insured. In exchange for payments from the insured, the insurer pays for damages to the insured which are caused by covered perils, acts or events as specified by the language of the insurance policy. The payments from the insured are generally referred to as "premiums," and typically are paid on behalf of the insured upon purchase of the insurance policy or over time at periodic intervals. The amount of the damages payment is generally referred to as a "coverage amount" or a "face amount" of the insurance policy. An insurance policy may remain (or have a status or state of) "in-force" while premium payments are made during the term or length of coverage of the policy as indicated in the policy. An insurance policy may "lapse" (or have a status or state of "lapsed"), for example, when the parameters of the insurance policy have expired, when premium payments are not being paid, when a cash value of a policy falls below an amount specified in the policy (e.g., for variable life or universal life insurance policies), or if the insured or the insurer cancels the policy.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein may relate to property insurance policies, it should be appreciated that an insurance provider may offer or provide one or more different types of insurance policies. Other types of insurance policies may include, for example, homeowners insurance; condominium owner insurance; renter's insurance; life insurance (e.g., whole-life, universal, variable, term); health insurance; disability insurance; long-term care insurance; annuities; business insurance (e.g., property, liability, commercial auto, workers compensation, professional and specialty liability, inland marine and mobile property, surety and fidelity bonds); boat insurance; insurance for catastrophic events such as flood, fire, volcano damage and the like; motorcycle insurance; farm and ranch insurance; personal article insurance; personal liability insurance; personal umbrella insurance; community organization insurance (e.g., for associations, religious organizations, cooperatives); and other types of insurance products. In embodiments as described herein, the insurance providers process claims related to insurance policies that cover one or more properties (e.g., homes, automobiles, personal articles), although processing other insurance policies is also envisioned. The present embodiments may also relate to providers of financial services, such as home, auto, or personal loans, or checking or savings accounts, credit cards, and/or mutual funds.

The terms "insured," "insured party," "policyholder," "customer," "claimant," and "potential claimant" may be used interchangeably herein to refer to a person, party, or entity (e.g., a business or other organizational entity) that is covered by the insurance policy, e.g., whose insured article or entity (e.g., property, life, health, auto, home, business) is covered by the policy.

Typically, a person or customer (or an agent of the person or customer) of an insurance provider fills out an application for an insurance policy. In some cases, the data for an application may be automatically determined or already associated with a potential customer. The application may undergo underwriting to assess the eligibility of the party and/or desired insured article or entity to be covered by the insurance policy, and, in some cases, to determine any specific terms or conditions that are to be associated with the insurance policy, e.g., amount of the premium, riders or exclusions, waivers, and the like. Upon approval by underwriting, acceptance of the applicant to the terms or conditions, and payment of the initial premium, the insurance policy may be in-force, (i.e., the policyholder is enrolled).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

We claim:

1. A computer-implemented method for controlling a client service interaction in an enterprise, wherein a client is involved in a client-initiated interaction with a recipient via a communication channel, and wherein there are two or more available communication channels, the computer-implemented method comprising:

receiving, by a processor, a client-initiated communication from the client;

identifying, by the processor, the client based on discernible information associated with the client-initiated communication;

retrieving, by the processor, an internal client identification for the client;

retrieving, by the processor, from an electronic centralized data storage element, client information for the client based on the internal client identification, wherein the client information represents one or more prior client-initiated experiences of the client with at least one of the two or more available communication channels;

discerning, by the processor, based on the client information, a purpose of the client-initiated interaction;

monitoring, by the processor, the two or more available communication channels to determine wait times for each communication channel;

determining, by the processor, based on the one or more prior client-initiated experiences with a first communication channel of the two or more available communication channels, an association of the purpose of the client-initiated interaction with the first communication channel;

determining, by the processor, a prioritization for the client based on the first communication channel, the purpose of the client-initiated interaction, and the wait times;

determining, by the processor, based on the prioritization and the one or more prior client-initiated experiences, a second communication channel of the two or more available communication channels, wherein the second communication channel facilitates a second type of interaction distinct from a first type of interaction facilitated by the first communication channel;

routing, by the processor, the client-initiated communication to the recipient via the second communication channel based on the prioritization; and adding, by the processor, to the electronic centralized data storage element, additional client information generated during the client-initiated interaction, including information representative of an experience of the client with the second communication channel.

2. The computer-implemented method as set forth in claim 1, wherein the first type of interaction is a text interaction and the second type of interaction is a voice interaction.

3. The computer-implemented method as set forth in claim 1, further comprising:

determining, by the processor, that the recipient is associated with at least one of the one or more prior client-initiated experiences; and identifying, by the processor, the first communication channel of the two or more available communication channels further based on determining that the recipient is associated with the at least one of the one or more prior client-initiated experiences.

4. The computer-implemented method as set forth in claim 1, wherein discerning the purpose of the client-initiated interaction comprises predicting, by the processor, based on the one or more prior client-initiated experiences, the purpose of the client-initiated interaction.

5. The computer-implemented method as set forth in claim 1, wherein:

the computer-implemented method further comprises determining, by the processor, based on the client information, a predicted life event, and discerning the purpose of the client-initiated interaction comprises predicting, by the processor, based on the predicted life event, the purpose of the client-initiated interaction.

6. The computer-implemented method as set forth in claim 1, wherein the client information includes a history of past interactions.

7. The computer-implemented method as set forth in claim 1, wherein the client information includes a current status of the client.

8. The computer-implemented method as set forth in claim 1, wherein the purpose of the client-initiated interaction is given by the client.

9. The computer-implemented method as set forth in claim 1, wherein the purpose of the client-initiated interaction is predicted based on the client information.

10. The computer-implemented method as set forth in claim 1, further comprising:

determining, based on a first client interaction quality history for the first type of interaction facilitated by the first communication channel, that the client is a visual communicator; and determining the association of the purpose of the client-initiated interaction with the first communication channel further based on determining that the client is a visual communicator.

11. The computer-implemented method as set forth in claim 1, further comprising:

determining, based on a first client interaction quality history for the first type of interaction facilitated by the first communication channel, that the client is an audio communicator; and determining the association of the purpose of the client-initiated interaction with the first communication channel further based on determining that the client is the audio communicator.

12. The computer-implemented method as set forth in claim 1, wherein determining the second communication channel is further based on determining that the client is one of a visual communicator or an audio communicator.

13. The computer-implemented method as set forth in claim 1, further comprising adjusting electronically a work schedule for the recipient based on the prioritization.

14. The computer-implemented method as set forth in claim 13, wherein adjusting the work schedule for the recipient is further based on a projected traffic volume for at least one of the first communication channel or the second communication channel.

15. The computer-implemented method as set forth in claim 1, wherein discerning the purpose of the client-initiated interaction based on the client information comprises:

determining, based on machine-generated data associated with the client information, that a bill associated with the client is due; and discerning the purpose of the client-initiated interaction based on determining that a bill associated with the client is due.

16. The computer-implemented method as set forth in claim 1, wherein discerning the purpose of the client-initiated interaction based on the client information comprises determining the purpose of the client-initiated interaction based on computer analysis of voice data or audio data provided by the client.

17. The computer-implemented method as set forth in claim 1, wherein adding the additional client information generated during the client-initiated interaction to the electronic centralized data storage element comprises streaming interaction data generated on the second communication channel and associated with the client-initiated communication to the electronic centralized data storage element.

18. The computer-implemented method as set forth in claim 1, further comprising adjusting a work schedule for the recipient based on the additional client information in the electronic centralized data storage element.

19. A computing system for automatically implementing a client interaction via a communication channel, the computing system comprising:

a processor; and memory in communication with the processor, the memory storing instructions that, when executed by the processor, cause the processor to perform operations comprising:

receiving a client-initiated communication from the client directed to a recipient;

determining an internal client identifier based on discernible information associated with the client-initiated communication;

retrieving client information from a data storage element based on the internal client identifier, wherein the client information represents one or more prior client-initiated experiences of the client with at least one communication channel of two or more communication channels;

discerning a purpose of the client-initiated interaction based on the client information;

monitoring the two or more communication channels to determine wait times for individual channels of the two or more communication channels;

determining, based on the one or more prior client-initiated experiences with a first communication channel of the two or more communication channels, an association of the purpose of the client-initiated interaction with the first communication channel;

determining a prioritization for the client by based on the first communication channel, the purpose of the client-initiated interaction, and the wait times;

determining, based on the prioritization and the one or more prior client-initiated experiences, a second communication channel of the two or more communication channels, wherein the second communication channel facilitates a second type of interaction distinct from a first type of interaction facilitated by the first communication channel;

routing the client-initiated to the recipient via the second communication channel based on the prioritization; and adding additional client information generated during the client-initiated interaction to the data storage element, wherein the additional client information represents an experience of the client with the second communication channel.

20. A non-transitory computer-readable storage medium storing processor-executable instructions for automatically implementing a client interaction via one or more communications channels that, when executed, cause one or more processors to perform operations comprising:

receiving a client-initiated communication from the client directed to a recipient;

determining an internal client identifier based on discernible information associated with the client-initiated communication;

retrieving client information from a data storage element based on the internal client identifier, wherein the client information represents one or more prior client-initiated experiences of the client with at least one communication channel of two or more communication channels;

discerning a purpose of the client-initiated interaction based on the client information;

monitoring the two or more communication channels to determine wait times for individual channels of the two or more communication channels;

determining, based on the one or more prior client-initiated experiences with a first communication channel of the two or more communication channels, an association of the purpose of the client-initiated interaction with the first communication channel;

determining a prioritization for the client by based on the first communication channel, the purpose of the client-initiated interaction, and the wait times;

determining, based on the prioritization and the one or more prior client-initiated experiences, a second communication channel of the two or more communication channels, wherein the second communication channel facilitates a second type of interaction distinct from a first type of interaction facilitated by the first communication channel;

routing the client-initiated to the recipient via second communication channel based on the prioritization; and adding additional client information generated during the client-initiated interaction to the data storage element, wherein the additional client information represents an experience of the client with the second communication channel.

* * * * *